United States Patent [19]

Mukai

[11] Patent Number: 5,668,858
[45] Date of Patent: Sep. 16, 1997

[54] CONTROL DEVICE FOR A FACSIMILE APPARATUS

[75] Inventor: Hirokazu Mukai, Tokyo, Japan

[73] Assignee: NEC Corporation, Tokyo, Japan

[21] Appl. No.: 564,799

[22] Filed: Nov. 29, 1995

[30] Foreign Application Priority Data

Nov. 30, 1994 [JP] Japan .................................. 6-296560

[51] Int. Cl.$^6$ .............................. H04M 11/00; H04N 1/32
[52] U.S. Cl. ................... 379/100.01; 358/434; 358/468; 379/93.26
[58] Field of Search ........................... 379/100, 96–98, 379/386; 358/434–439, 442, 443, 468

[56] References Cited

U.S. PATENT DOCUMENTS

| 4,386,239 | 5/1983 | Chien | 379/386 |
|---|---|---|---|
| 4,502,049 | 2/1985 | Atkinson | 379/386 |
| 4,823,375 | 4/1989 | Yoshida | 379/100 |
| 5,022,071 | 6/1991 | Mozer et al. | 379/100 |
| 5,146,489 | 9/1992 | Telibasa | 379/100 |
| 5,224,155 | 6/1993 | Satomi et al. | 379/100 |
| 5,267,301 | 11/1993 | Nishii | 379/93 |
| 5,325,425 | 6/1994 | Novas et al. | 358/435 |
| 5,349,634 | 9/1994 | Shimomura | 358/434 |
| 5,471,317 | 11/1995 | Charbonnier | 379/100 |
| 5,479,501 | 12/1995 | Lai | 379/386 |
| 5,526,410 | 6/1996 | Jacobs | 379/98 |

FOREIGN PATENT DOCUMENTS

| 63-062467 | 3/1988 | Japan . |
|---|---|---|
| 2-11056 | 1/1990 | Japan . |

*Primary Examiner*—Curtis Kuntz
*Assistant Examiner*—Xu Mei
*Attorney, Agent, or Firm*—Foley & Lardner

[57] ABSTRACT

In a facsimile apparatus capable of executing automatic call termination on detecting a terminating signal, a control device has a frequency detection circuit and a frequency detection control circuit. The frequency detection circuit detects a terminating signal of, e.g., 1300 Hz by monitoring not only the frequency of 1300 Hz but also other frequencies. The frequency detection control circuit accurately determine, based on the output of the frequency detection circuit, whether an input from a network is the terminating signal of 1300 Hz or whether it is noise containing a 1300 Hz component.

3 Claims, 3 Drawing Sheets

CONTROL DEVICE FOR A FACSIMILE APPARATUS

BACKGROUND OF THE INVENTION

The present invention relates to a facsimile apparatus and, more particularly, to a control device for a facsimile apparatus and capable of executing automatic call termination by detecting a terminating signal.

A facsimile apparatus with an automatic call terminating function is capable of entering into a call termination mode on detecting a terminating signal of 1,300 Hz input from a public telephone network. For this purpose, a receiver included in the apparatus has a function of detecting and identifying a 1300 Hz frequency component. The prerequisite with this function is that when noise components around 1300 Hz are received together with the terminating signal, the noise components be excluded.

It has been customary with the above facsimile apparatus to monitor only the 1300 Hz component with a terminating signal detection circuit. If the 1300 Hz component has a level higher than a predetermined level, the detection circuit determines that it is a terminating signal. Japanese Patent Laid-Open Publication No. 63-62467, for example, discloses a device for distinguishing a facsimile protocol signal and a speech signal by determining whether the protocol signal is a continuous pattern or whether it is an discontinuous pattern. Also, Japanese Patent Laid-Open publication No. 2-11056 proposes a device for distinguishing a speech signal and a data signal by detecting the frequency component of a received signal and then subjecting it to computation.

However, the conventional scheme which monitors only the 1300 Hz component has a problem that even noise containing a 1300 Hz component is determined to be the terminating signal if such a component is higher in level than the predetermined level. The continuous/discontinuous pattern scheme is apt to result in a detection error when continuous noise is received. Further, the distinction between a speech signal and a data signal is not practicable without resorting to large scale equipment.

SUMMARY OF THE INVENTION

It is, therefore, an object of the present invention to provide a facsimile apparatus capable of detecting a terminating signal of particular frequency, e.g., 1300 Hz with accuracy.

In accordance with the present invention, a facsimile apparatus has a network control circuit for controlling the connection of the facsimile apparatus to a public telephone network. A frequency detection circuit detects the frequency of a terminating signal input from the public telephone network, and an input level at above frequency. A frequency detection control circuit controls the frequency detection circuit so as to execute automatic call termination on the basis of the result of detection of the frequency detection circuit. The frequency detection circuit has a first detector for detecting the input level at the frequency of the terminating signal for automatic call termination, and a second detector for detecting an input level at a frequency which is rarely included in the terminating signal for automatic call termination. The frequency detection control circuit has means for executing the automatic call termination if the input level detected by the first detector is higher than or equal to a predetermined level, and if the input level detected by the second detector is lower than the predetermined level.

Also, in accordance with the present invention, a facsimile apparatus has a network control circuit for controlling the connection of the facsimile apparatus to a public telephone network. A frequency detection circuit detects the frequency of a terminating signal input from the public telephone network, and an input level at the above frequency. A frequency detection control circuit controls the frequency detection circuit so as to execute automatic call termination on the basis of the result of detection of the frequency detection circuit. The frequency detection circuit has a first detector for detecting the input level at the frequency of the terminating signal for automatic call termination, a second detector for detecting an input level at a frequency higher than the frequency of the terminating signal for automatic call termination, and a third detector for detecting an input level lower than the frequency of the terminating signal for automatic call termination. The frequency detection control circuit has means for executing the automatic call termination if the input level detected by the first detector is higher than or equal to a predetermined level, and if the input levels detected by the second and third detectors both are lower than the predetermined level.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
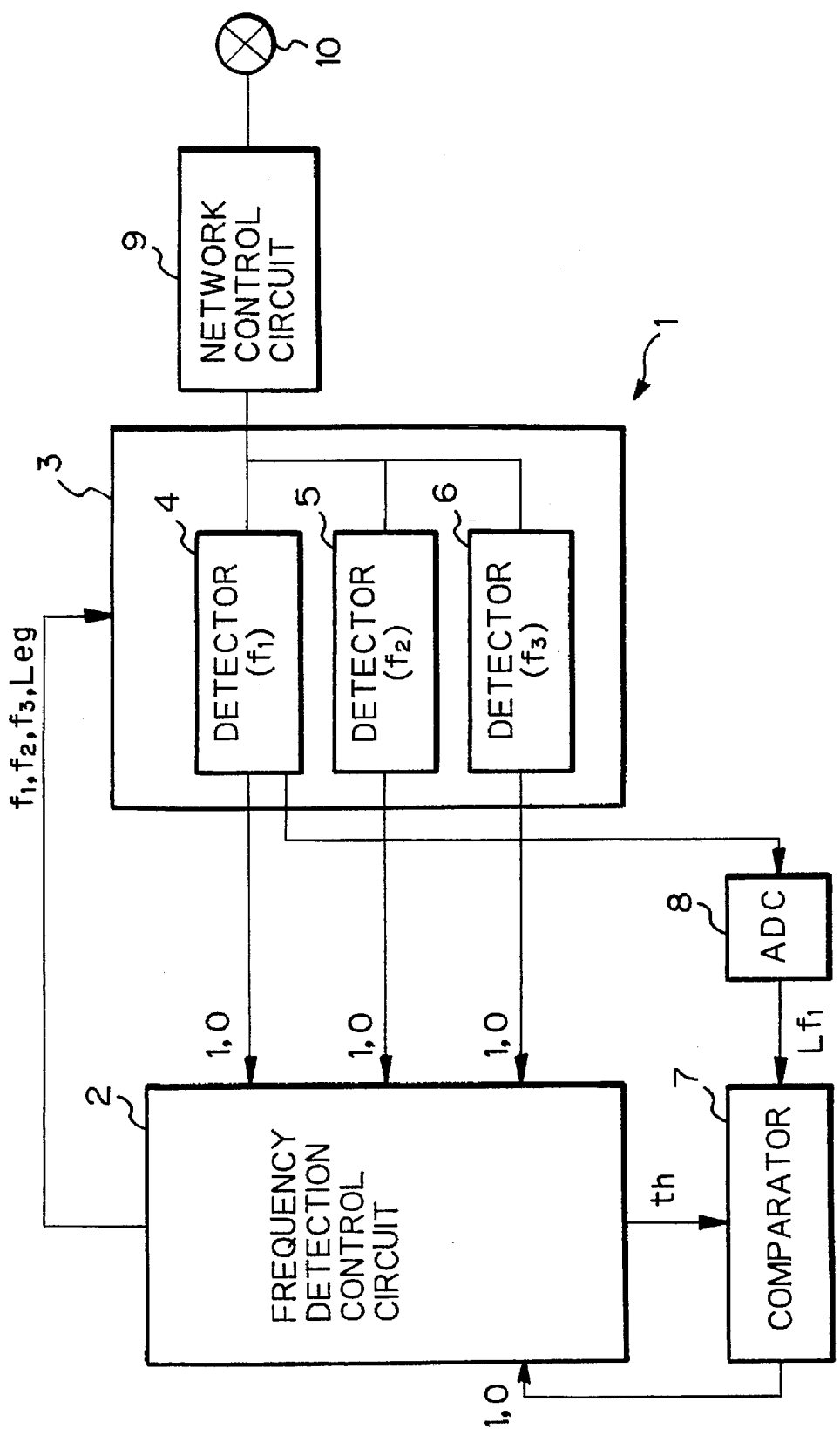
FIG. 1 is a block diagram schematically showing a facsimile apparatus embodying the present invention.

Referring to FIG. 1 of the drawings, a facsimile apparatus embodying the present invention, particularly a control device thereof, is shown. As shown, the control device, generally 1, is connected to public telephone network 10 and connects the facsimile apparatus to the network on detecting a terminating signal. A frequency detection control circuit 2 controls a frequency detection circuit 3, sets frequencies f1, f2 and f3 to be detected and a threshold level Leg for energy detection, and makes the final decision on the detection. The threshold level Leg is representative of a preselected input level. The frequency detection circuit 3 is made up of a first to a third frequency detector 4–6 and detects frequency components in accordance with the set frequencies f1–f3 and threshold level Leg.

Specifically, the first to third detectors 4–6 include, e.g., bandpass filters for separating frequency components f1–f3, respectively. The detector 4 determines the energy of the separated frequency component f1 and reports the result of detection to the control circuit 2 by use of a signal which is (logical) ONE or ZERO. At the same time, the detector 4 feeds to an analog-to-digital converter (ADC) 8 an analog signal representative of the level of the frequency component f1. The second detector 5 determines the energy of the separated frequency component f2, and reports the result of detection to the control circuit 2 by use of a signal ONE or ZERO. Further, the third detector 6 determines the energy of the separated frequency component f3 and reports the result of detection to the control circuit 2 by use of a signal ONE or ZERO.

The ADC 8 transforms the input analog signal representative of the level of the frequency component f1 to a corresponding digital signal Lf1. A comparator 7 compares the signal Lf1 with a digital threshold level t h for detection set by the control circuit 2. The comparator 7 delivers a ZERO to the control circuit 2 if the level Lf1 is higher than the threshold level t h or delivers a ONE thereto if the former is lower than the latter. A network control circuit 9 connects the facsimile apparatus and the network 10.

In the following description, assume that the frequencies f1–f3 are 1,300 Hz, 1,000 Hz and 1,600 Hz, respectively, that the threshold level Leg is −40 dBm, and that the threshold level t h is a value which can be varied as desired.

Figure 2:
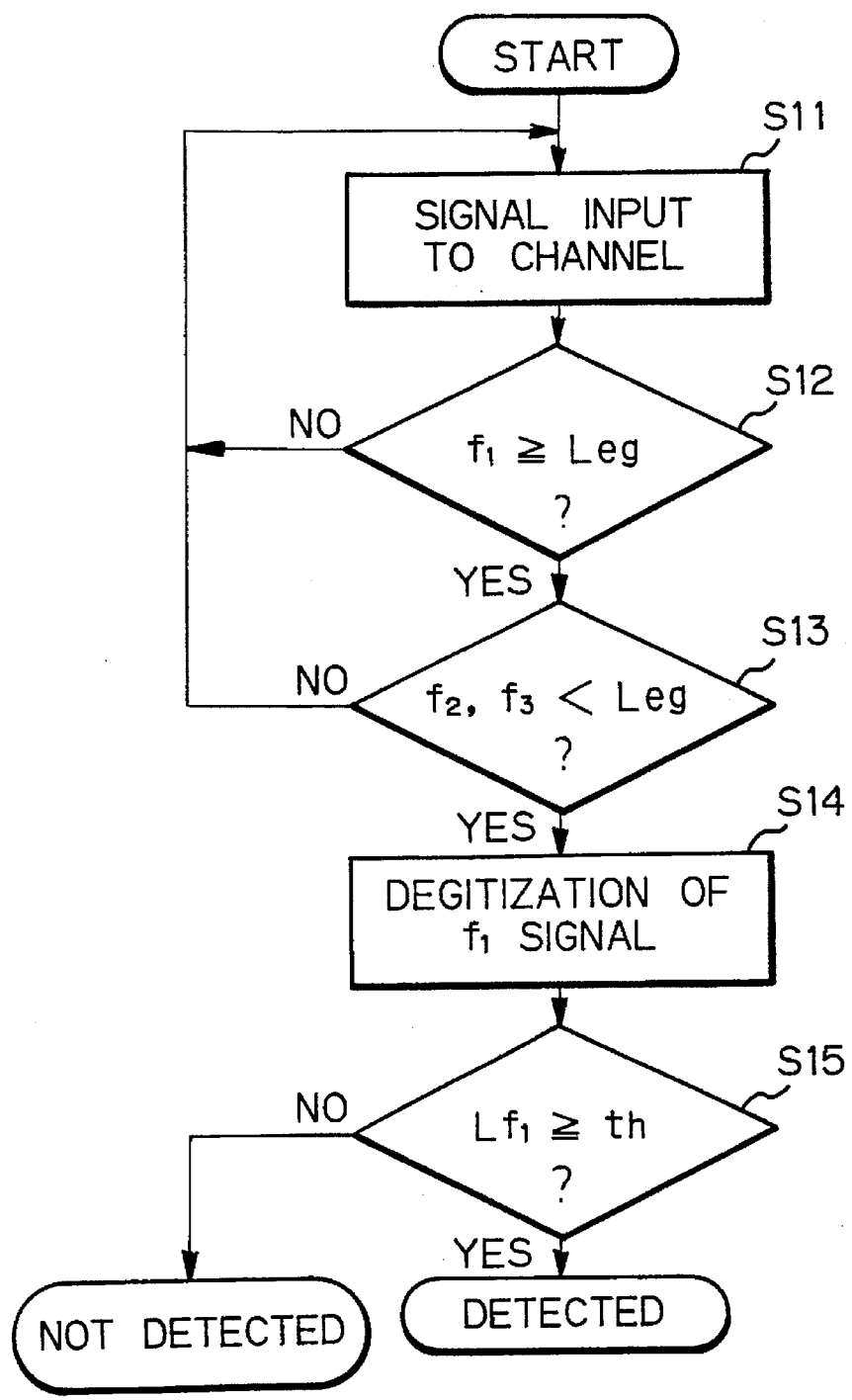
FIG. 2 is a flowchart demonstrating a specific operation of the embodiment.

A specific operation of the control device 1 will be described with reference to FIG. 2. Before the device 1 starts a program shown in FIG. 2, the control circuit 2 sets the preselected frequencies f1–f3, threshold level Leg, and threshold level t h, although not shown in the figure. First, when a signal is input to the control device 1 from the network 10, (step 11), the frequency detector 4 detects the frequency component f1 out of the signal in response to a frequency f1 command fed from the control circuit 2, and determines whether or not its level is higher than or equal to the threshold level Leg (step S12). If the answer of this decision is negative (NO), the detector 4 delivers a ZERO to the control circuit 2. As a result, the frequency f1 command from the control circuit 2 is maintained, and the program returns to the step S11. However, if the level of the frequency f1 component is higher than or equal to the threshold level Leg (YES, step S12), the detector 4 feeds a ONE to the control circuit 2. In response, the control circuit 2 sequentially feeds a frequency f2 command and a frequency f3 command to the frequency detection circuit 3.

The detector 5 separates the frequency component f2 in response to the frequency f2 command, and determines whether or not its level is lower than the threshold level Leg (step S13). The detector 5, like the detector 4, feeds the result of decision, i.e., a ONE or a ZERO to the control circuit 2. If the level of the frequency component f2 is lower than the threshold level Leg (YES, step S13), the detector 6 separates the frequency component f3 in response to the frequency f3 command, and determines whether or not its level is lower than the threshold level Leg (step S13). The detector 6 also feeds the result of decision, i.e., a ONE or a ZERO to the control circuit 2.

Assume that the input frequency components f1, f2 and f3 have levels of −34 dBm, −50 dBm, and −55 dBm, respectively. Then, because the output of the detector 4 is a ONE and the outputs of the detectors 5 and 6 are a ZERO (YES, step 12 and YES, step 13), a step S14 is executed, as will be described. If one or both of the levels of the frequency components f2 and f3 are higher than the threshold level Leg of −40 dBm (NO, step S13), the program returns to the step S11.

In the step 14, an analog signal representative of the level of the frequency component f1 is fed from the detector 4 to the ADC 8 and transformed to a corresponding digital value Lf1. In the illustrative embodiment, the digital value Lf1 is representative of −34 dBm. The comparator 7 compares the digital value Lf1 with the digital threshold level t h fed from the control circuit 2 to see if the former is higher than or equal to the latter (step S15). If the answer of the step 15 is positive (YES), the comparator 7 delivers a ONE to the control circuit 2. In response, the control circuit 2 determines that a terminating signal of frequency f1, i.e., 1300 Hz has been detected. If the output Lf1 of the ADC 8 is lower than the threshold level t h (NO, step S15), the comparator 7 feeds a ZERO to the control circuit 2. As a result, the control circuit 2 determines that the above terminating signal has not been detected.

Figure 3B:
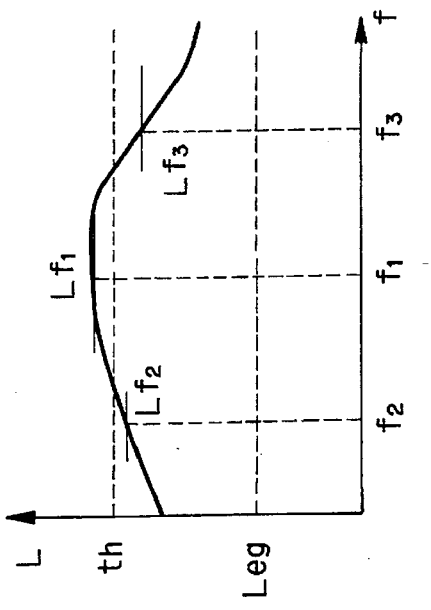
FIGS. 3B–3D show specific waveforms of signals in response to which the embodiment does not execute automatic call termination.
Figure 3D:
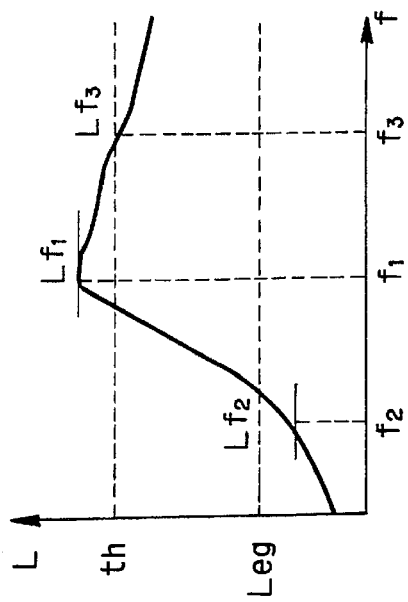
Figure 3A:
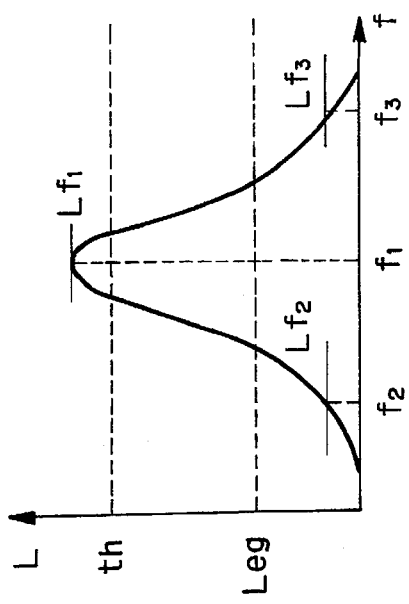
FIG. 3A shows a specific waveform of a terminating signal in response to which the embodiment executes automatic call termination.
Figure 3C:
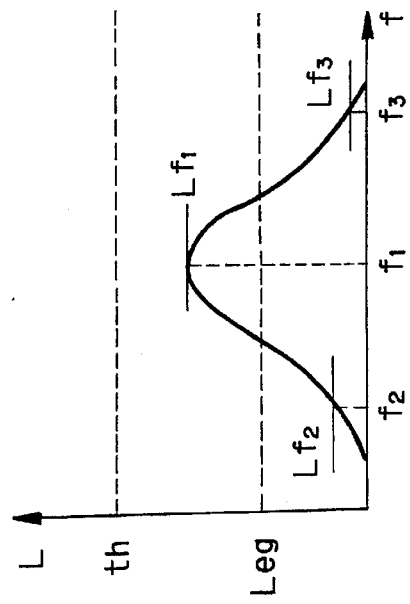

FIGS. 3A–3D show specific waveforms of signals input to the network control circuit 9. Among them, only the signal shown in FIG. 3A is determined to be a terminating signal. The signals shown in FIGS. 3B and 3D are not qualified because one or both of Lf2 and Lf3 are higher than Leg. The signal shown in FIG. 3C is not qualified because Lf1 is lower than t h, although Lf2 and Lf3 are lower than Leg.

In summary, in accordance with the present invention, a control device for a facsimile apparatus detects a terminating signal of, e.g., 1300 Hz by monitoring not only the frequency of 1300 Hz but also other frequencies. The control device can, therefore, accurately determine whether an input from a network is the terminating signal of 1300 Hz or whether it is noise containing a 1300 Hz component.

Various modifications will become possible for those skilled in the art after receiving the teachings of the present disclosure without departing from the scope thereof.

What is claimed is:

1. A facsimile apparatus comprising:

a network control circuit for controlling connection of said facsimile apparatus to a public telephone network;

a frequency detection circuit for detecting a frequency of a terminating signal input from the public telephone network, and an input level at said frequency; and a frequency detection control circuit for controlling said frequency detection circuit so as to execute automatic call termination on the basis of a result of detection of said frequency detection circuit;

said frequency detection circuit comprising:

a first detector for detecting the input level at the frequency of the terminating signal for automatic call termination; and a second detector for detecting an input level at a frequency which is rarely included in the terminating signal for automatic call termination;

said frequency detection control circuit comprising means for executing the automatic call termination if the input level detected by said first detector is higher than or equal to a predetermined level, and if the input level detected by said second detector is lower than said predetermined level.

2. A facsimile apparatus comprising:

a network control circuit for controlling connection of said facsimile apparatus to a public telephone network;

a frequency detection circuit for detecting a frequency of a terminating signal input from the public telephone network, and an input level at said frequency; and a frequency detection control circuit for controlling said frequency detection circuit so as to execute automatic call termination on the basis of a result of detection of said frequency detection circuit;

said frequency detection circuit comprising:

a first detector for detecting the input level at the frequency of the terminating signal for automatic call termination;

a second detector for detecting an input level at a frequency higher than the frequency of the terminating signal for automatic call termination; and a third detector for detecting an input level lower than the frequency of the terminating signal for automatic call termination;

said frequency detection control circuit comprising means for executing the automatic call termination if the input level detected by said first detector is higher than or equal to a predetermined level, and if the input levels detected by said second and third detectors both are lower than said predetermined level.

3. A facsimile apparatus as claimed in claim 2, wherein said frequency detection control circuit further comprises:

an analog-to-digital converter (ADC) for converting the terminating signal detected by said first detector to a digital value;

a comparator for comparing the digital value output from said ADC with a predetermined threshold value;

means for feeding the terminating signal detected by said first detector to said ADC if the input levels detected by said second and third detectors both are lower than said predetermined level; and means for executing automatic termination of the terminating signal when the digital value output from said ADC is greater than said predetermined threshold value.

\* \* \* \* \*